US010572687B2

(12) United States Patent
Jungwirth

(10) Patent No.: US 10,572,687 B2
(45) Date of Patent: Feb. 25, 2020

(54) COMPUTER SECURITY FRAMEWORK AND HARDWARE LEVEL COMPUTER SECURITY IN AN OPERATING SYSTEM FRIENDLY MICROPROCESSOR ARCHITECTURE

(71) Applicant: U.S. Army Research Laboratory, Adelphi, MD (US)

(72) Inventor: Patrick W. Jungwirth, Abingdon, MD (US)

(73) Assignee: America as represented by the Secretary of the Army, Washington, DC (US)

(*) Notice: Subject to any disclaimer, the term of this patent is extended or adjusted under 35 U.S.C. 154(b) by 378 days.

(21) Appl. No.: 15/474,263

(22) Filed: Mar. 30, 2017

(65) Prior Publication Data

US 2017/0300719 A1 Oct. 19, 2017

Related U.S. Application Data

(60) Provisional application No. 62/323,980, filed on Apr. 18, 2016.

(51) Int. Cl.
*G06F 21/62* (2013.01)
*G06F 12/0875* (2016.01)
(Continued)

(52) U.S. Cl.
CPC ...... *G06F 21/6281* (2013.01); *G06F 12/0875* (2013.01); *G06F 12/0897* (2013.01);
(Continued)

(58) Field of Classification Search
CPC ........... G06F 21/6281; G06F 12/0875; G06F 12/0897; G06F 21/78; G06F 2212/1052; G06F 2221/2141

See application file for complete search history.

(56) References Cited

U.S. PATENT DOCUMENTS 6,997,716 B2 2/2006 Jungwirth et al.
7,401,358 B1 * 7/2008 Christie ............... G06F 9/4403
711/163
(Continued)

OTHER PUBLICATIONS

T. Mudge, "Power: a First-Class Architectural Design Constraint," Computer, vol. 34, No. 4, pp. 52-58, Apr. 2001.
(Continued)

*Primary Examiner* — Joseph P Hirl
*Assistant Examiner* — Stephen T Gundry
(74) *Attorney, Agent, or Firm* — Christos S. Kyriakou

(57) ABSTRACT

A microprocessor computer system for secure/high assurance/safety critical computing includes a hardware subsystem having a plurality of cache controller and cache bank modules including cache bank and memory cell hardware permission bits for managing and controlling access to system resources. A computer security framework subsystem includes a hierarchy of access layers comprising top layers and lower layers. The permission bits provide hardware level computer security primitives for a computer operating system. The top layers are completely trusted and the lower layers are moderately trusted to completely untrusted. The top layers include a trusted operating system layer that executes management and control of the system resources and permission bits. The permission bits define limits for a hardware execution security mechanism for less trusted to completely untrusted software. Exceeding bounds of the security mechanism results in a hardware exception thereby blocking all attempts to access or modify resources outside the security mechanism.

18 Claims, 16 Drawing Sheets

(51) Int. Cl.
*G06F 12/0897* (2016.01)
*G06F 21/78* (2013.01)

(52) U.S. Cl.
CPC ...... *G06F 21/78* (2013.01); *G06F 2212/1052* (2013.01); *G06F 2221/2141* (2013.01)

(56) References Cited

U.S. PATENT DOCUMENTS

| | | | |
|---|---|---|---|
| 7,818,552 B2 | 10/2010 | Jungwirth | |
| 7,937,757 B2* | 5/2011 | Focke | G06F 9/45537 713/165 |
| 8,959,576 B2* | 2/2015 | Sastry | G06F 21/57 726/1 |
| 9,087,202 B2* | 7/2015 | Kang | G06F 21/60 |
| 9,122,610 B2* | 9/2015 | Jungwirth | G06F 12/0846 |
| 9,448,950 B2* | 9/2016 | Scarlata | G06F 12/1466 |
| 9,678,687 B2* | 6/2017 | Woodward | G06F 3/0623 |
| 9,904,805 B2* | 2/2018 | Chhabra | G06F 21/72 |
| 2003/0180692 A1 | 9/2003 | Jungwirth et al. | |
| 2004/0260910 A1* | 12/2004 | Watt | G06F 9/30076 712/43 |
| 2005/0103924 A1 | 5/2005 | Jungwirth et al. | |
| 2006/0294344 A1 | 12/2006 | Hsu et al. | |
| 2009/0164753 A1 | 6/2009 | Jungwirth | |
| 2011/0047542 A1* | 2/2011 | Dang | G06F 9/468 718/1 |
| 2014/0082298 A1* | 3/2014 | Jungwirth | G06F 12/0846 711/140 |
| 2014/0282819 A1* | 9/2014 | Sastry | G06F 21/57 726/1 |
| 2014/0337983 A1* | 11/2014 | Kang | G06F 21/60 726/26 |
| 2015/0032996 A1* | 1/2015 | Koeberl | G06F 9/3802 712/205 |
| 2015/0128262 A1* | 5/2015 | Glew | G06F 21/554 726/23 |
| 2015/0178226 A1* | 6/2015 | Scarlata | G06F 12/1466 711/163 |
| 2015/0378930 A1* | 12/2015 | Sahita | G06F 12/1009 711/207 |
| 2015/0381634 A1* | 12/2015 | Lal | H04L 63/12 713/168 |
| 2016/0085695 A1* | 3/2016 | Leslie-Hurd | G06F 12/1441 711/163 |
| 2016/0371496 A1* | 12/2016 | Sell | G06F 9/45558 |
| 2017/0083724 A1* | 3/2017 | Chhabra | G06F 21/72 |
| 2017/0090800 A1* | 3/2017 | Alexandrovich | G06F 13/4068 |
| 2017/0090821 A1* | 3/2017 | Woodward | G06F 3/0623 |
| 2019/0012273 A1* | 1/2019 | Leslie-Hurd | G06F 12/1441 |

OTHER PUBLICATIONS

S. Vangal, et. al., "5-GHz 32-Bit Integer Execution Core in 130-nm dual-VT CMOS," Solid-State Circuits, IEEE Journal of, vol. 37, No. 11, pp. 1421-1432, Nov. 2002.

C. Chow, "Dynamic Voltage Scaling for Commercial FPGAs," Proceedings of the IEEE International Conference on Field-Programmable Technology, pp. 173-180, Dec. 11-14, 2005.

N. Muralimanohar, et al., "Architecting Efficient Interconnects for Large Caches with CACTI 6.0," IEEE Micro, vol. 28, No. 1, pp. 69-79, Jan.-Feb. 2008.

"File System Permissions", http://en.wikipedia.org/wiki/File—permissions , Aug. 4, 2011.

* cited by examiner

FIG. 2

| Object | OS Friendly Microprocessor Access Levels | | | |
|---|---|---|---|---|
| Microkernel (Boot) | 0 | n/a | n/a | 0 |
| Microkernel | 0 | 0 | 0 | 0, 1 |
| Microkernel Drivers | 1 | 1 | 1, 2 | 2, 3 |
| Hypervisor | n/a | 2 | 3, 4 | 4, 5 |
| Thick OS | 2 | 3 | 5, 6, 7 | 7, 8, 9 |
| OS Libraries (DLL's) | 2 | 3 | 7 | 10, 11 |
| OS Drivers | 2 | 4 | 8 | 8, 9 |
| Applications | 3 | 5 | 9 | 10, 11 |
| | | | | 6 |

Trust Level: Complete — Untrusted

COMPUTER SECURITY FRAMEWORK AND HARDWARE LEVEL COMPUTER SECURITY IN AN OPERATING SYSTEM FRIENDLY MICROPROCESSOR ARCHITECTURE

CROSS REFERENCE TO RELATED APPLICATION

This application claims the benefit of U.S. Provisional Patent Application No. 62/323,980 filed on Apr. 18, 2016, the contents of which, in its entirety, is herein incorporated by reference.

GOVERNMENT INTEREST

The embodiments herein may be manufactured, used, and/or licensed by or for the United States Government without the payment of royalties thereon.

BACKGROUND

Technical Field

The embodiments herein generally relate to computer technologies, and more particularly to computer microprocessors.

Description of the Related Art

Conventional microprocessors have not tried to balance hardware performance and operating system (OS) performance at the same time. Moreover, conventional computer architectures do not adequately support computer security. By taking into consideration the costs and benefits of implementing functions in hardware and in the OS at the same time, this leads to optimizations resulting in a higher performance OS, and low power requirements. The cost is a modest increase in hardware complexity.

SUMMARY

In view of the foregoing, an embodiment herein provides a microprocessor computer system for secure/high assurance/safety critical computing, the microprocessor computer system comprising a hardware subsystem comprising a plurality of cache controller and cache bank modules, wherein the modules comprise cache bank hardware permission bits and memory cell hardware permission bits for managing and controlling access to system resources; and a computer security framework subsystem comprising a hierarchy of access layers comprising top layers and lower layers, wherein the cache bank hardware permission bits and the memory cell hardware permission bits provide hardware level computer security primitives for a computer operating system, wherein the top layers are completely trusted and the lower layers are moderately trusted to completely untrusted, wherein the top layers comprise a trusted operating system layer that executes management and control of the system resources, the cache bank hardware permission bits, and the memory cell hardware permission bits, wherein the cache bank hardware permission bits and the memory cell hardware permission bits define limits for a hardware execution security mechanism for less trusted to completely untrusted software, and wherein exceeding bounds of the security mechanism results in a hardware exception thereby blocking all attempts to access or modify resources outside the security mechanism.

The modules may comprise a program instruction memory module comprising a first internal cache, a first external cache and memory module, a first direct memory access (DMA) controller, and a first cache controller and cache bank module; a data memory module comprising a second internal cache, a second external cache and memory module, a second DMA controller, and a second cache controller and cache bank module; a register memory module comprising a third internal cache, a third external cache and memory module, a third DMA controller, and a third cache controller and cache bank module; and a pipeline state memory module comprising a fourth internal cache, a fourth external cache and memory module, a fourth DMA controller, and a fourth cache controller and cache bank module, wherein the hardware subsystem further comprises a microprocessor execution pipeline connected to the first, second, third, and fourth cache controller and cache bank modules and communicating with the first, second, third, and fourth DMA controllers.

The trusted operating system layer manages and controls the cache bank and memory cell hardware permission bits to enforce the limits of the security mechanism for execution of the less trusted to completely untrusted software. Exceeding the bounds of the security mechanism raises a hardware level exception managed by the trusted operating system layer. The trusted operating system layer has full access to all the hardware permission bits and is completely trusted. The modules communicate with the trusted operating system layer. The trusted operating system layer manages and controls the hardware level computer security primitives for the modules; the cache bank hardware permission bits, and the memory cell hardware permission bits. The trusted operating system layer manages the hardware exception resulting from exceeding the bounds of the hardware execution security mechanism. Only instructions from the program instruction memory module are executed by the microprocessor execution pipeline.

The program instruction memory module, the data memory module, the register memory module, and the pipeline state memory module are isolated from one another and perform memory read/write functions independently of one another. The microprocessor computer system may further comprise a cache bank lookup table that reduces the number of memory bits required to hold the memory cell hardware permission bits. Each of the first, second, third, and fourth cache controller and cache bank modules comprise an interface layer in communication with the trusted operating system layer. The cache bank hardware permission bits and the memory cell hardware permission bits provide instruction, data, register, cache bank and memory cell level trapping to debug software in real-time. Each of the first, second, third, and fourth cache controller and cache bank modules, and each of the first, second, third, and fourth DMA controllers manage overhead of a context switch for the computer operating system.

The trusted operating system layer permits the computer operating system to have access to computer system resources that are isolated from the trusted operating system layer. The software program debugging occurs at any of a register level, a memory address level, and a cache bank level by selectively setting the cache bank hardware permission bits and the memory cell hardware permission bits to a predetermined configuration. The hardware subsystem and the computer security framework subsystem comprise an operating system friendly microprocessor computer architecture system. The trusted operating system layer manages all permission bit settings, hardware exceptions, input/output, memory management, and DMA settings for the computer architecture. The pipelines for the first, second, third, and fourth cache controller and cache bank modules, and the first, second, third, and fourth DMA controllers respectively are separated from one another. The pipeline state memory module may be configured into latches of the microprocessor execution pipeline.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2 illustrates a table of some possible OSFA access levels according to an embodiment herein;

DETAILED DESCRIPTION

Figure 1:
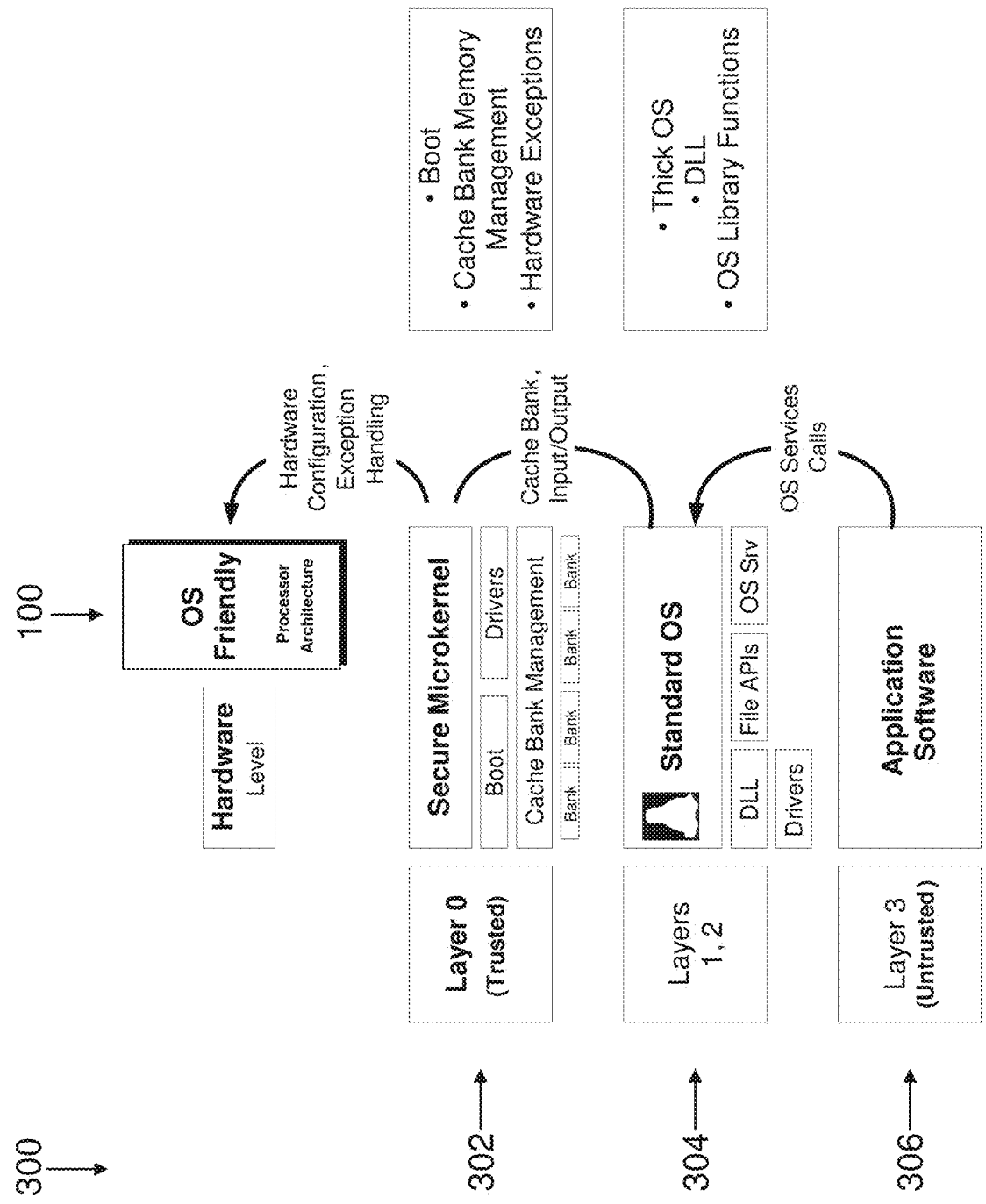
FIG. 1 illustrates an example computer security framework according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a framework for implementing hardware computer security, information assurance, and practical improvements to the OSFA's cache bank permission bits. The embodiments herein also provide for real-time, zero overhead software debugging. The embodiments herein describe how the hardware, operating system, and application software all work together to create a more secure computer system. The embodiments herein extend and improve the hardware permission bits to make their use more efficient. The cache bank to execution pipeline interface is also improved. The OSFA of the embodiments herein provides a high performance microprocessor and OS system. The architecture's cache memory banks provide for near instantaneous context switching and hardware based computer security. The OSFA includes hardware permission bits for each register, cache bank and each memory address. Herein, hardware permission bits are shown as set or allowed in bold, and not allowed in normal typeface. For example, hardware permission bits R W M (R=read, W=Write, and M=modify) read is allowed, write and modify are not allowed.

The OS Friendly Microprocessor Architecture's computer security goal is to completely separate control and data at the hardware level. The hardware/software computer security features substantially raise the difficulty level to hack a computer system. Current computer security best practices are based on a risk analysis and cost/benefit analysis. By completely separating control and data at the hardware level, the computer security risk is significantly reduced.

The OSFA is a switched set of cache memory banks in a pipeline configuration. For lightweight threads, the memory pipeline configuration provides near instantaneous context switching times. The pipelining and parallelism provided by the memory pipeline configuration provides for background cache read and write operations while the microprocessor's execution pipeline is running instructions. The cache bank selection controllers provide arbitration to prevent the memory pipeline and microprocessor's execution pipeline from accessing the same cache bank at the same time. This separation allows the cache memory pages to transfer to and from level 1 (L1) caching while the microprocessor pipeline is executing instructions.

OS computer security is implemented in hardware. By extending UNIX-like file permissions bits down to each cache memory bank, memory address, and register, the OSFA provides hardware level computer security. OS level access to cache memory banks is divided into access layers. Only the trusted OS (microkernel) has permission to access and modify permission bits. The OS access layers also support partitions for a high reliability microkernel, hypervisors and full featured OS. Referring now to the drawings, and more particularly to FIGS. 1 through 16, where similar reference characters denote corresponding features consistently throughout the figures, there are shown preferred embodiments.

FIG. 1 illustrates an example, framework for the OS Friendly Microprocessor Architecture. In order to reduce the complexity for describing the architecture's features, the access layers have been simplified to four layers. Here, four layers are considered to be the minimum number of access layers for the OSFA. An actual OSFA system would use more layers. A practical number of access layers is around eight. As shown in FIG. 2, more access layers are easy to define. Some computer security examples are provided for the example architecture 300 described in FIG. 1.

Some possible OSFA access levels are shown in FIG. 2. The access levels are set by cache permission bits. Access levels are specific to the OSFA. OS rings are similar; however, OS rings already have an accepted definition and functions. If there is a trusted application, one can give the trusted application higher level privileges than an untrusted OS. The secure microkernel in access layers 0 and 1 has exclusive access to the hardware permission bits. All other layers cannot access the file permission bits.

Figure 3:
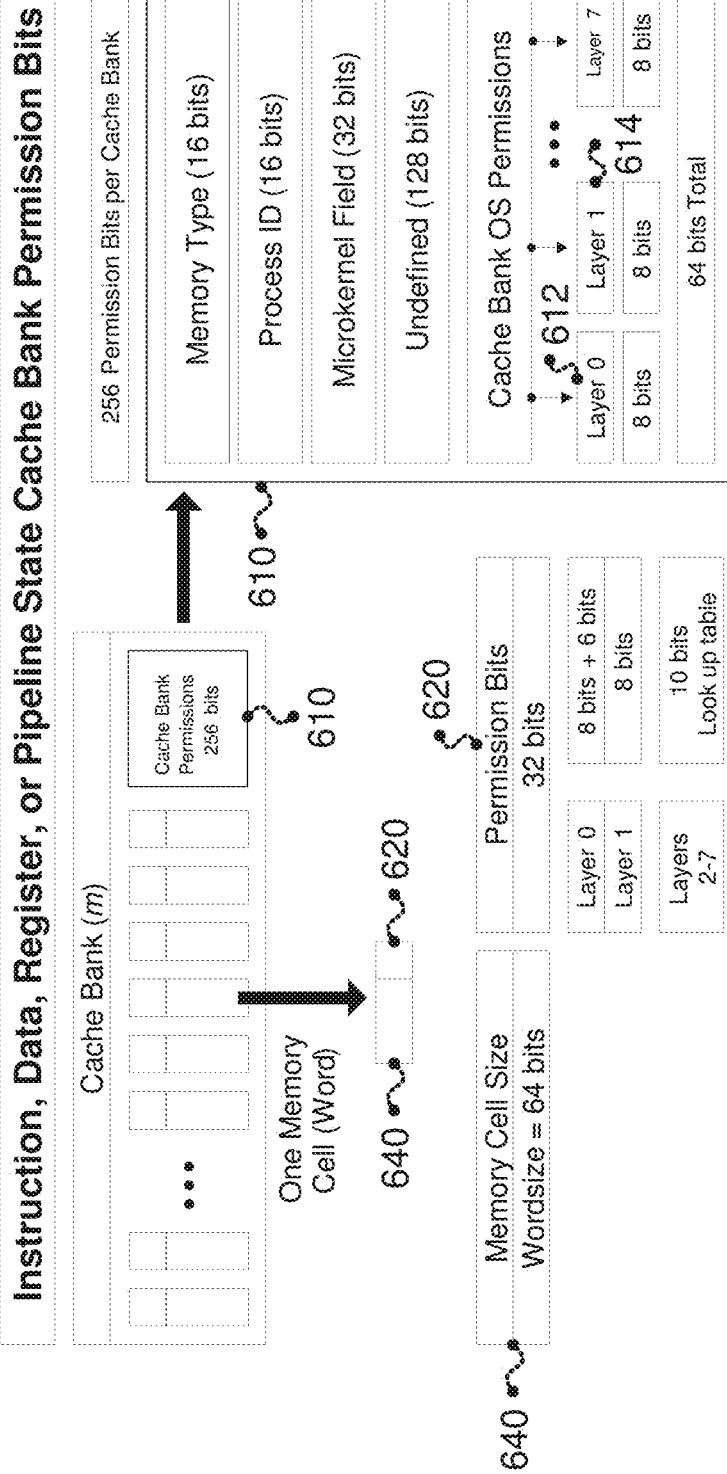
FIG. 3 illustrates a practical permission bit and cache bank architecture according to an embodiment herein.

An example, practical cache bank and permission bit architecture is described in FIG. 3. A 256 bit cache bank header 610 that describes the permission bits for the cache bank is provided. A memory type field 610A describes the type of memory contained in the cache bank. The process ID field 610B describes the "owner" of the cache bank. A microkernel field is defined for additional trusted OS (microkernel) control over the cache bank 610C. The undefined field may contain additional trusted OS settings, or a standard (thick) OS may call the trusted OS (microkernel) to include OS related cache bank information in the undefined field 610D.

The memory cost for the permission bits can be significant. For example, with 8 access levels, and 8 permission bits, and 16 bits for the memory type, one would need an additional 80 bits for each cache block. For a 1 k word cache bank, this is not significant; however, for each memory cell an additional 80 bits is large. A 1 k word permission bit cache look-up table (cache bank) 194 in FIG. 4, would only require 10 bits. For example, each memory cell could use 8 bits for layer_0, 8 bits for layer_1, and 10 bits for the cache look-up table (26 bits total) which would be much more practical. Layer_0 and layer_1 permission bits are included for each memory cell, for high speed microkernel access. A larger cache bank is possible; however, at some point, it becomes unpractical like the 80 bits per cell above. A practical size for the permission bits is illustrated in FIG. 3. Layers 0 and 1 have 14 bits and 8 bits for permission bits. The embodiments herein use a cache bank (look up table) 194 for layers 2 through 7 as illustrated in FIG. 4.

Each cache bank contains 256 bits (cache bank header) and word memory size (for example: 1024, 512, 256, 128, 64, . . . bits) bits/memory cell, and 32 permission bits/memory cell. For a 1 k word (64 bits/word) memory cache bank, 12 k bytes+32 bytes (header) of memory are required. For a 4 k word cache bank, 48 kbytes+32 bytes (header) of memory are required. For the example processor, one can use 1 k word (12 k bytes+32 bytes (header)) for the cache size. A good compromise for an actual microprocessor would be 8 k words (96 k bytes+32 bytes (header)). Larger or smaller cache memory banks may be used.

Figure 4:
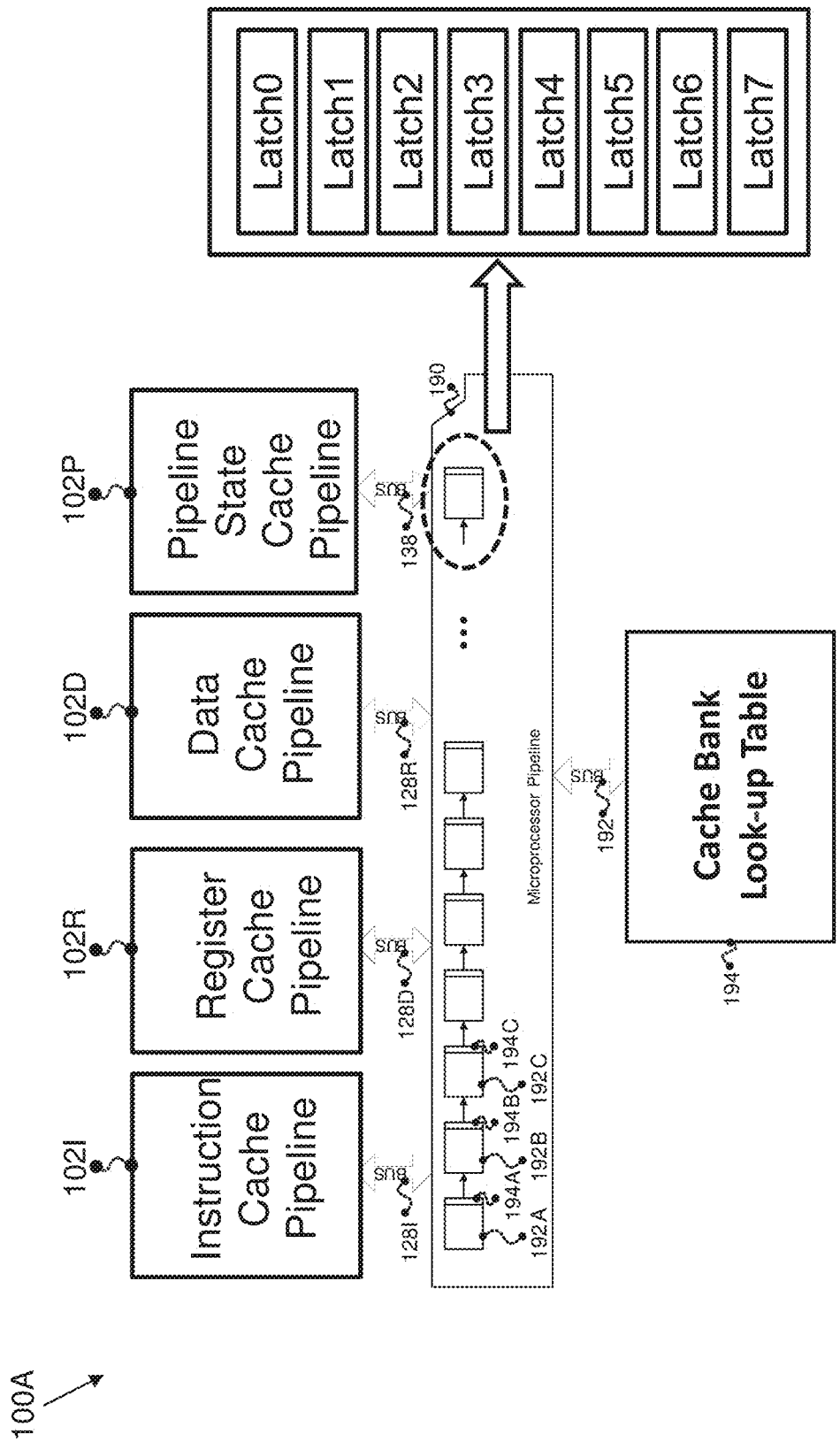
FIG. 4 illustrates cache bank look-up table to store permission bits and pipeline state cache bank simplification and power reduction.
Figure 5:
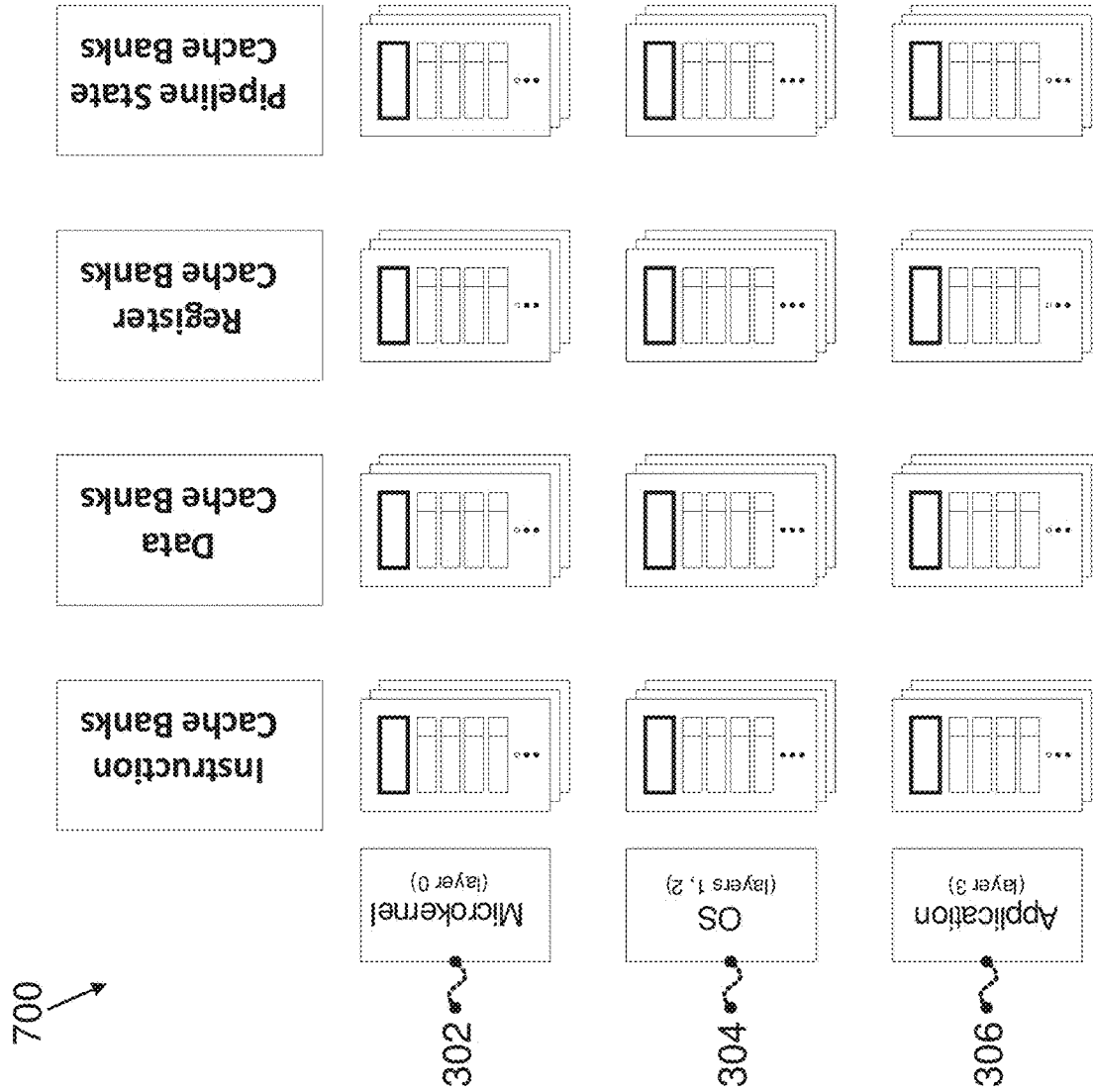
FIG. 5 illustrates a simplified example OSFA cache bank organization according to an embodiment herein.

FIG. 4 also illustrates an embodiment of moving the pipeline state cache banks into the execution pipeline's stage latches. The execution pipeline 190 latches 194A, 194B, 194C, et al. each contain latches (Latch0, Latch1, . . . , Latch7). By placing the pipeline state cache bank directly into the execution pipeline, a parallel memory copy is not required. A serial memory copy reduces complexity and power requirements.

The OSFA's cache bank organization, for the 4-layer model example introduced in FIG. 1, is described in FIGS. 5, 6, 7, and 8. There are three groups of cache banks 700: trusted OS, microkernel, (layer 0) 302 in FIG. 6, thick OS (layers 1 and 2) 304 in FIG. 7, and application software (layer 3) 306 in FIG. 8. The trusted OS (microkernel) controls and configures all cache bank permission bits. The microkernel has full access to the OSFA's permission bits and it is completely trusted. At the hardware level, all cache banks are the same. Only instructions in the instruction cache banks are executed. The data, register, and pipeline state cache banks are not connected to the instruction decode block in the execution pipeline and cannot be executed. The data, register, and pipeline state cache banks are not connected to the instruction cache bank pipeline. The contents of the data, register, and pipeline state cache banks cannot be copied to the instruction cache banks.

Figure 9:
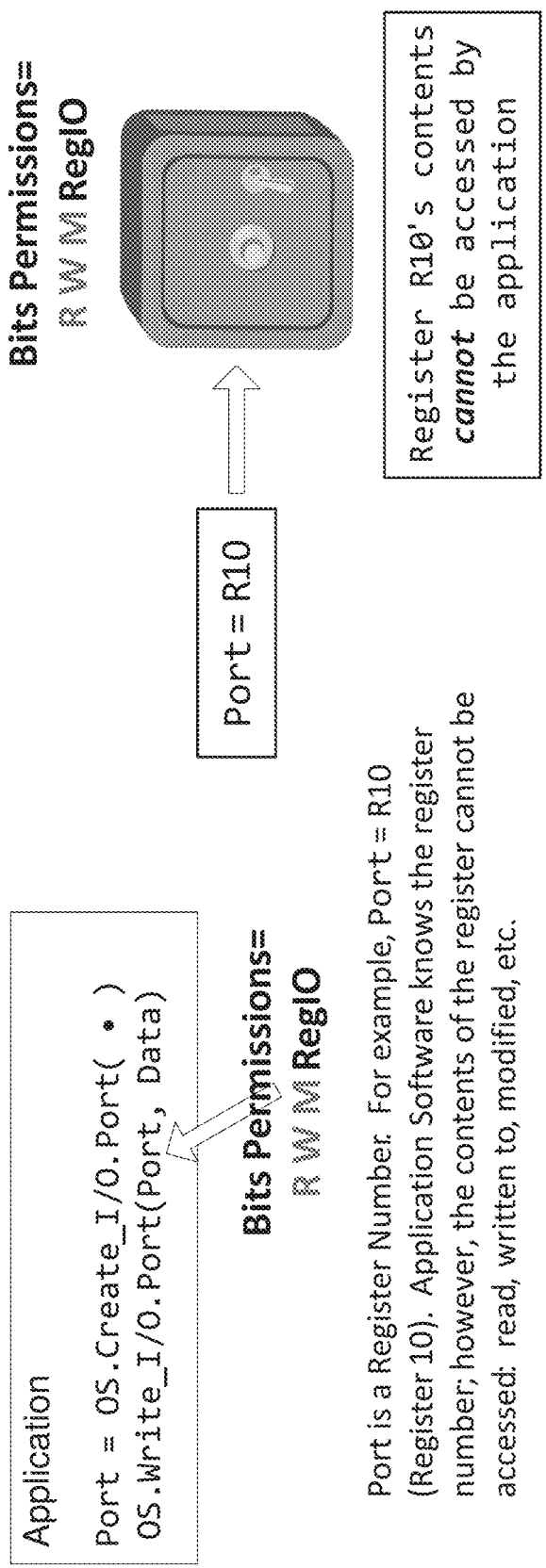
FIG. 9 illustrates computer security provided by the hardware permission bits according to an embodiment herein.

FIG. 9 illustrates the permission bit operation for a microprocessor register used as a pointer to an input/output (I/O) port. The permission bits guarantee that the pointer can be trusted. Here, trust refers to the software level. Modifying the system hardware could break trust. Only the microkernel has access to the actual address for the pointer to the I/O Port. The software application in FIG. 9 knows the register number containing the I/O pointer; however, the software application cannot access the contents of the register (memory address is contained in the register). The running software application calls Port=OS.Create_I/O.Port(.), OS.Write_I/O(Port, Data). The pointer Port is configured as R W M, read/write/modify not allowed, and RegIO is set (defined as I/O port). Port address is contained in a register memory and cannot be accessed (read, written to, or modified) by the application software. The application software only knows that Port (Register R10) contains the I/O port address. As illustrated in FIG. 9, the contents of Register R10, cannot be accessed by the application software. The permission bits also allow individual memory cells and cache banks to be configured as R W M RegIO for I/O and other uses.

Figure 10:
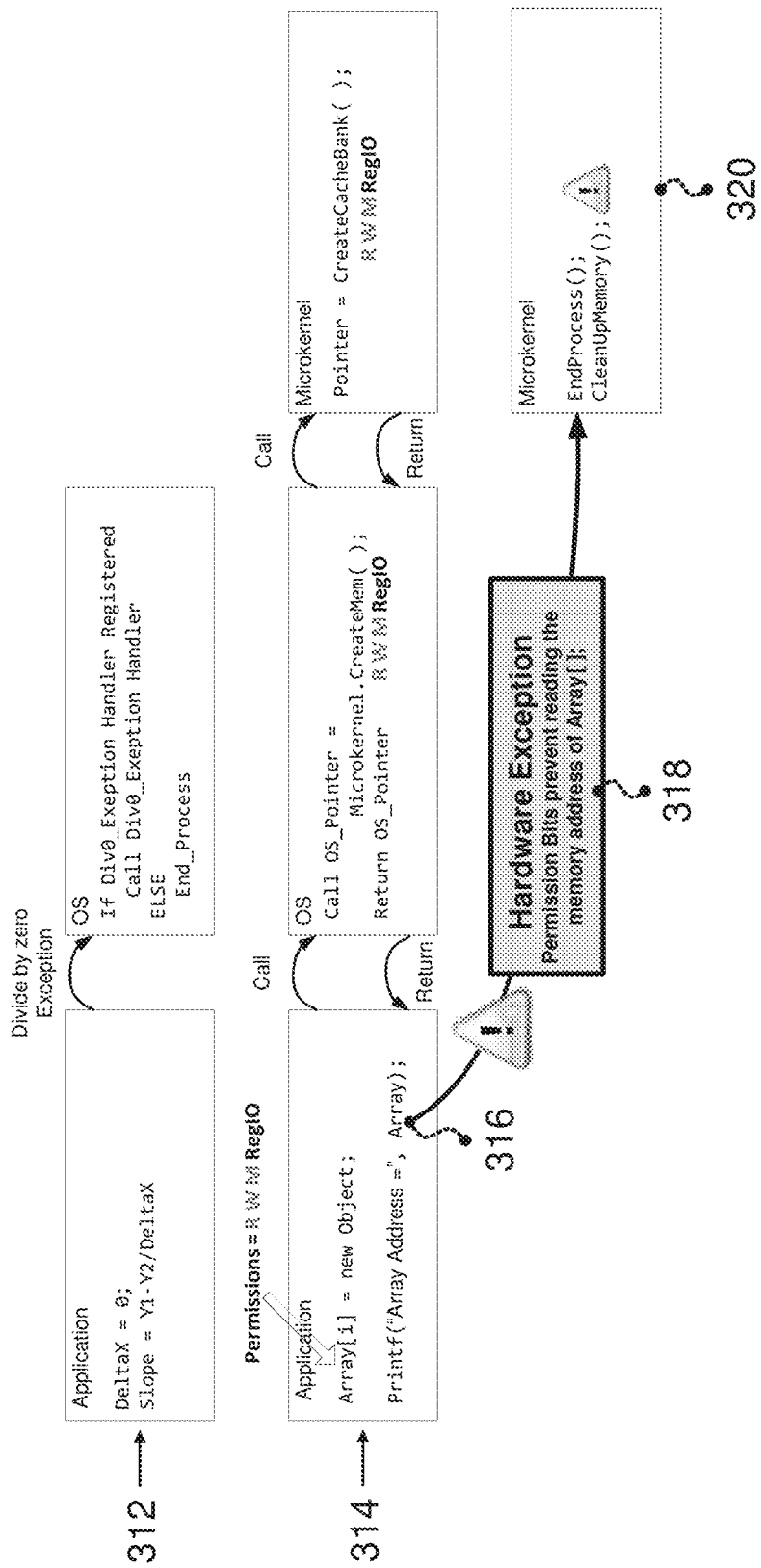
FIG. 10 illustrates software and permission bit exception handling according to an embodiment herein

Two example exceptions are illustrated in FIG. 10. A simple divide by zero error 312 in the application software raises an exception handled by the operating system. If the software application has provided an exception handler, it is called by the OS; else, the OS terminates the running application.

With the permission bits set to R W M (read, write, modify are not allowed), if the application software 314 attempts to read the array pointer's address 316 a memory access violation exception is raised 318. The OSFA's hardware detects a memory access violation and calls the trusted OS (microkernel) to handle the exception 320. A system developer could include a microkernel driver to handle the memory exception and even allow reading the address contained in the pointer array. However, this would be considered poor coding style, violate the security layer hierarchy, and be an open door for hacking.

The hardware permission bits provide a hardware level sandbox completely isolating the thick OS, and applications software from the trusted OS (microkernel). Any instruction, memory operation, I/O operation that exceeds the bounds of the permission bits (results in an operation outside of the sandbox) raises a hardware exception before memory, cache banks, I/O, etc. could be modified. Permission bits test every operation in hardware in real-time, so there is no software level overhead.

Figure 6:
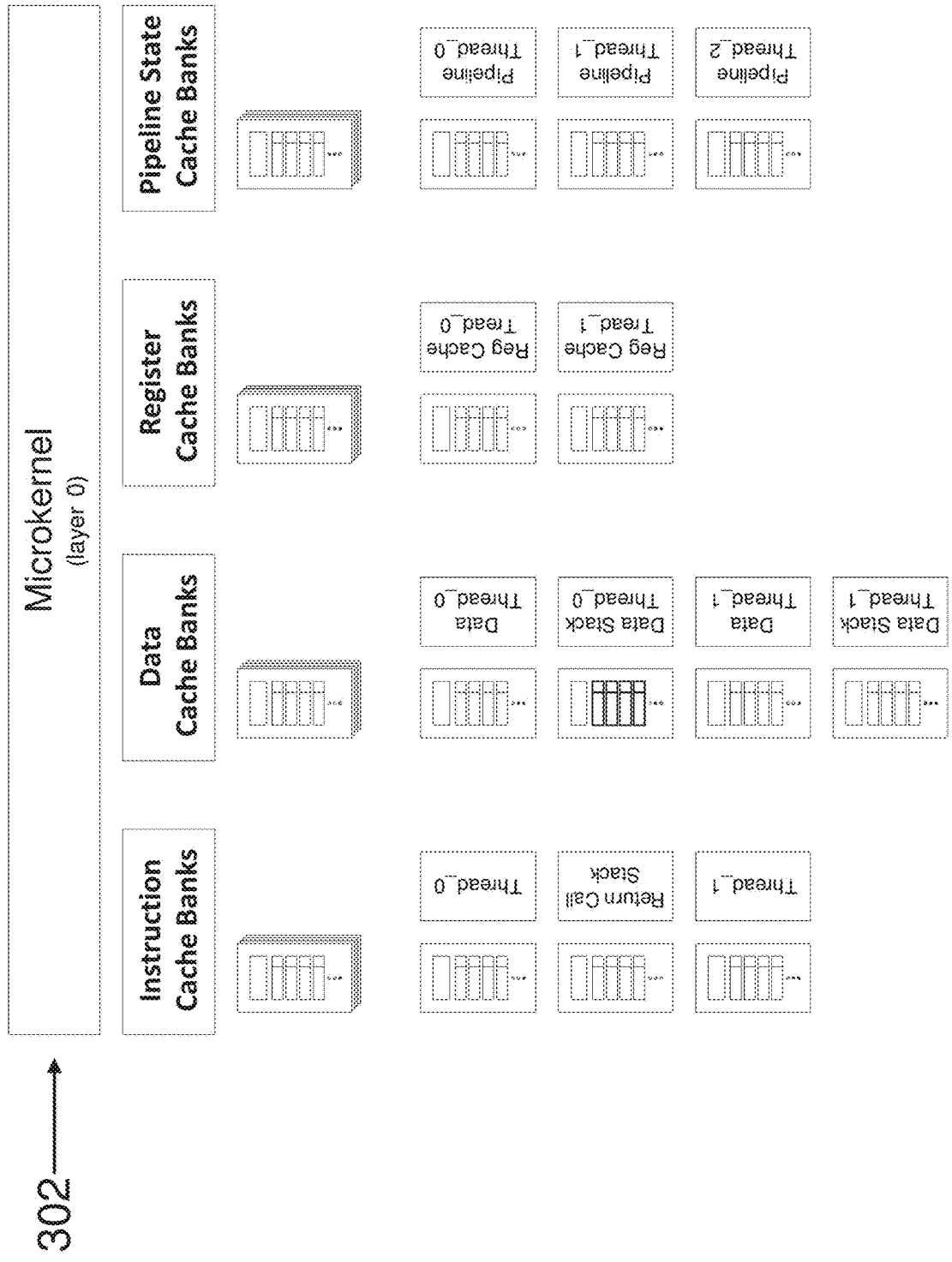
FIG. 6 illustrates a simplified example trusted OS (microkernel) cache bank memory configuration according to an embodiment herein.

FIG. 6 presents a simplified example of trusted OS (microkernel) cache banks 302 and cache bank contents. FIG. 6 does not present the full details for a complete microkernel. The four cache bank pipelines, instruction, data, register, and pipeline state are completely separated. The contents from one cache bank type cannot be copied to another cache bank type. For example, data placed on the data stack cannot be accessed by the instruction cache bank pipeline. Two treads, thread_0 and thread_1, are contained in the instruction cache bank set. Only the instruction cache bank pipeline 102I connects to the OSFA's 190 instruction decode stage in execution pipeline. A third cache bank is used as a return function call stack for the microkernel. Data in the data cache banks cannot be copied into the return function call stack.

Data cache banks contain data in use by thread_0 and thread_1. Each thread may be assigned its own stack space in the set of data cache banks. The separation of thread stack areas also enforces isolation between threads. Each thread, thread_0 and thread_1, has its own set of registers in the set of register cache banks. The pipeline state cache banks contain the latch states from the microprocessor's execution pipeline. The pipeline state cache banks allow for very rapid context switching.

Figure 7:
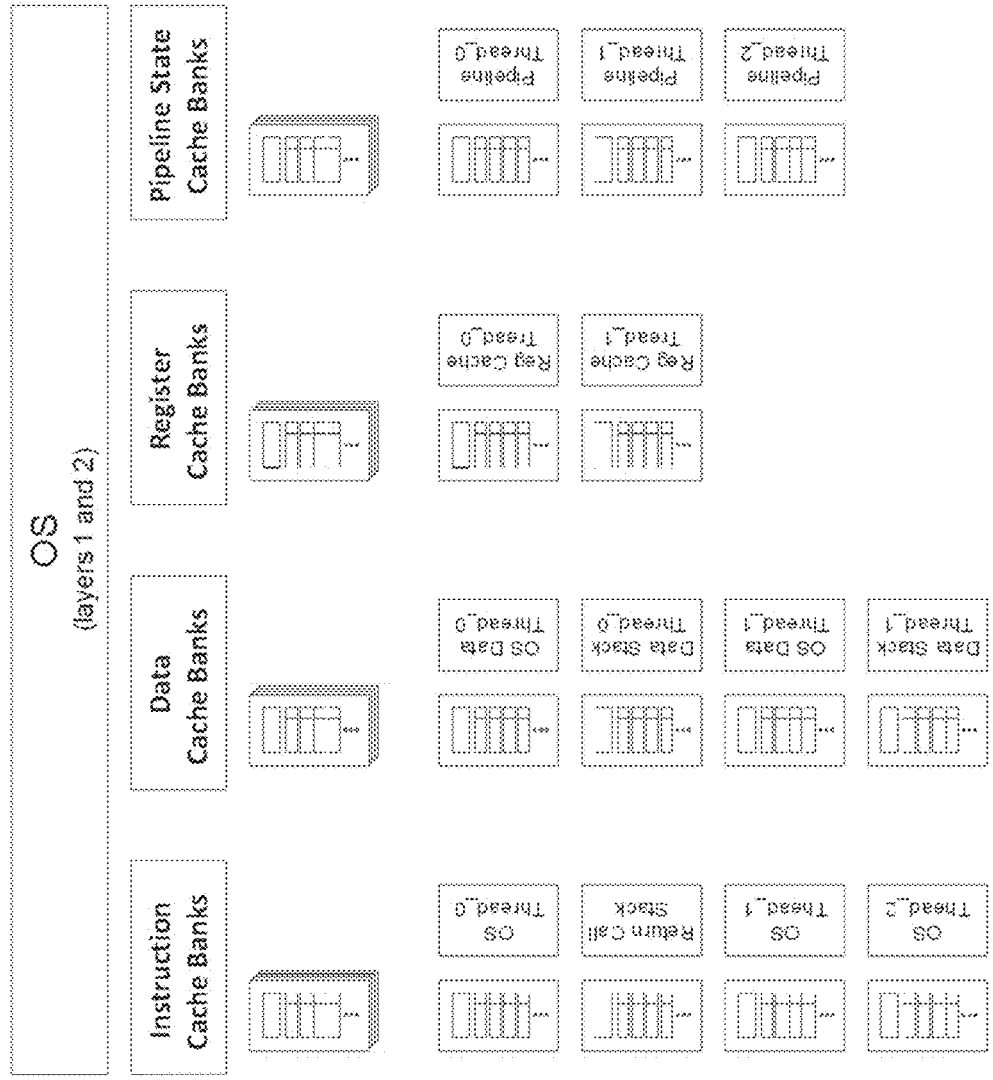
FIG. 7 illustrates a simplified example standard (thick) OS cache bank organization according to an embodiment herein.
Figure 8:
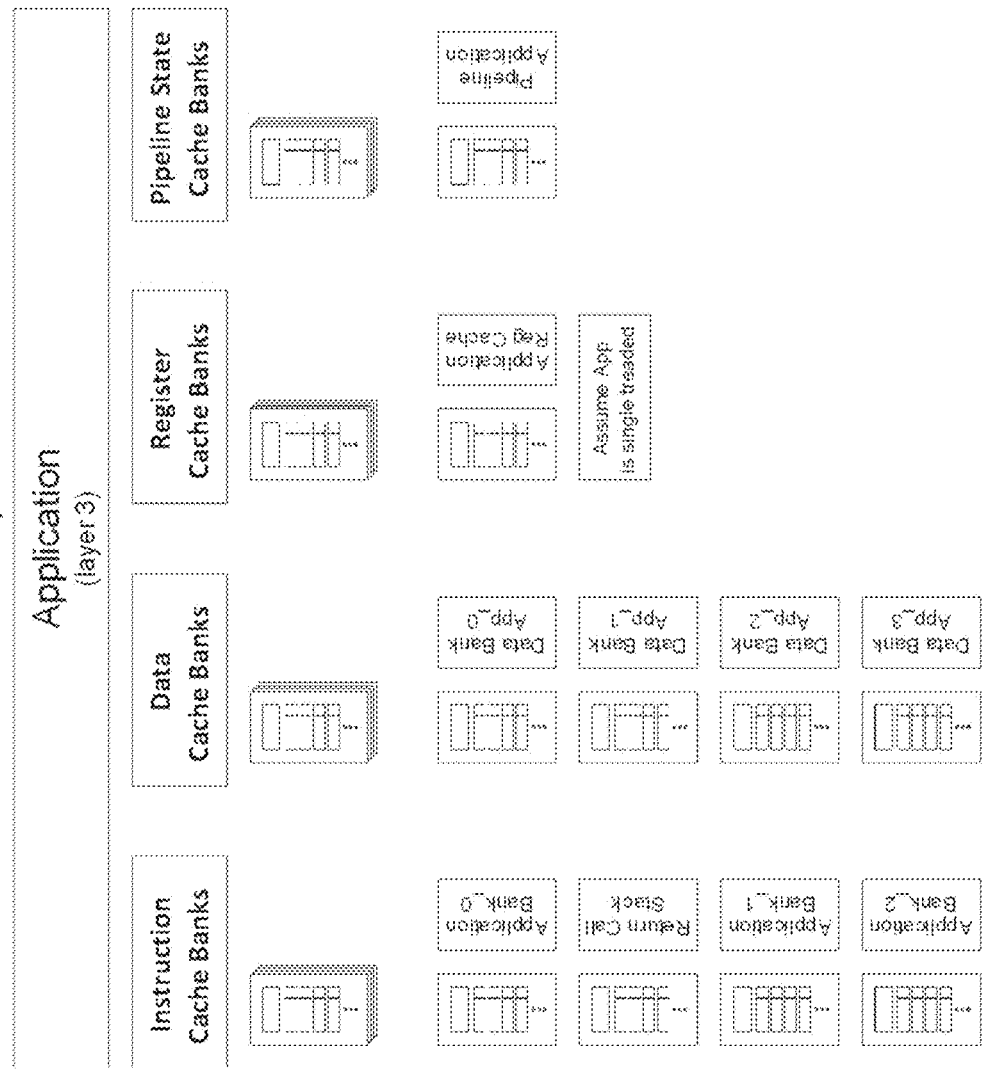
FIG. 8 illustrates a simplified example application cache bank organization according to an embodiment herein.

The instruction, data, register, and pipeline state cache banks in FIGS. 7 and 8, for the thick OS 304 and applications software 306, have the same hierarchy as the microkernel 302. The trusted OS (microkernel) configures all cache banks and permission settings. The thick OS and applications software are "clients" to the microkernel. The microkernel manages all permission bit settings, hardware exceptions, I/O, memory management, and DMA settings for the OSFA. The cache bank architecture provides high speed context switches, and very efficient I/O. The direct memory access/cache bank configuration provides a common memory transfer interface for all memory operations.

Figure 11:
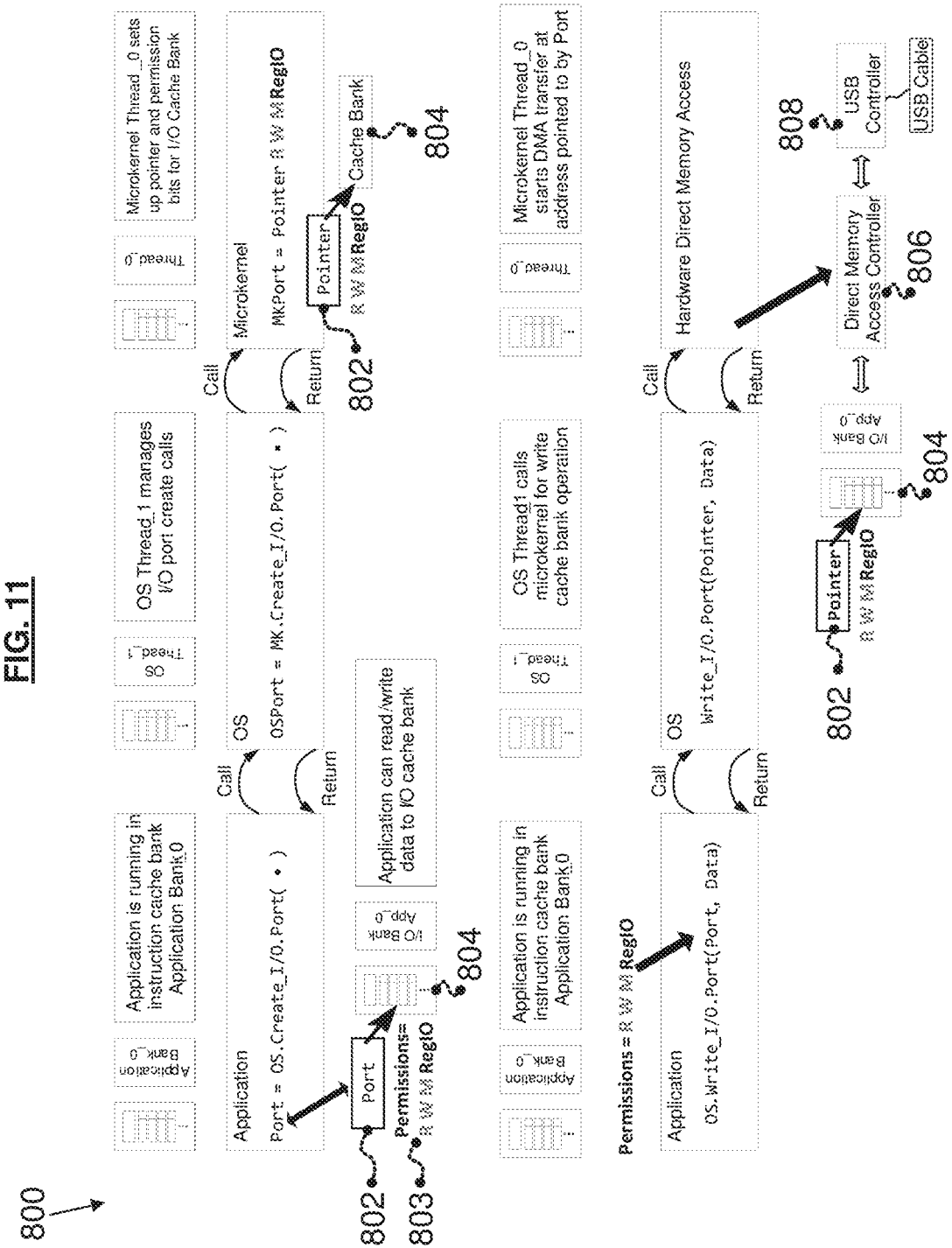
FIG. 11 illustrates an application of writing a cache bank block of data to USB controller according to an embodiment herein.

In FIG. 11 an example 800 is provided showing the interaction between trusted OS (microkernel), thick OS, and applications software for a USB I/O example using the cache banks described in FIGS. 6, 7, and 8. The software application in Application Bank_0 (cache bank) is executing the machine code equivalent of the high level instruction Port=OS.Create_I/O.Port( ). The OS transfers the call to the microkernel with create I/O port, OSPort=MK.Create_I/O.Port( ). The microkernel creates a pointer 802 with permission bits R W M IRegIO (bold=allowed/set, regular=not allowed) 803 to a cache bank contained in a data cache bank 804. The application program has permission to write data into the cache bank; however, it cannot access the contents of the pointer (register). The pointer (register) contains the memory address of the cache bank.

Once the data has been placed in the I/O Bank for App_0, the application calls the thick OS. The thick OS calls the microkernel which simply enables a direct memory access controller 806 starting at the address found in the pointer Port. The USB controller 808 handles the USB protocol. Any attempt to bypass the hardware sandbox enforced by the permission bits results in a hardware level exception as illustrated in FIG. 10.

Figure 12:
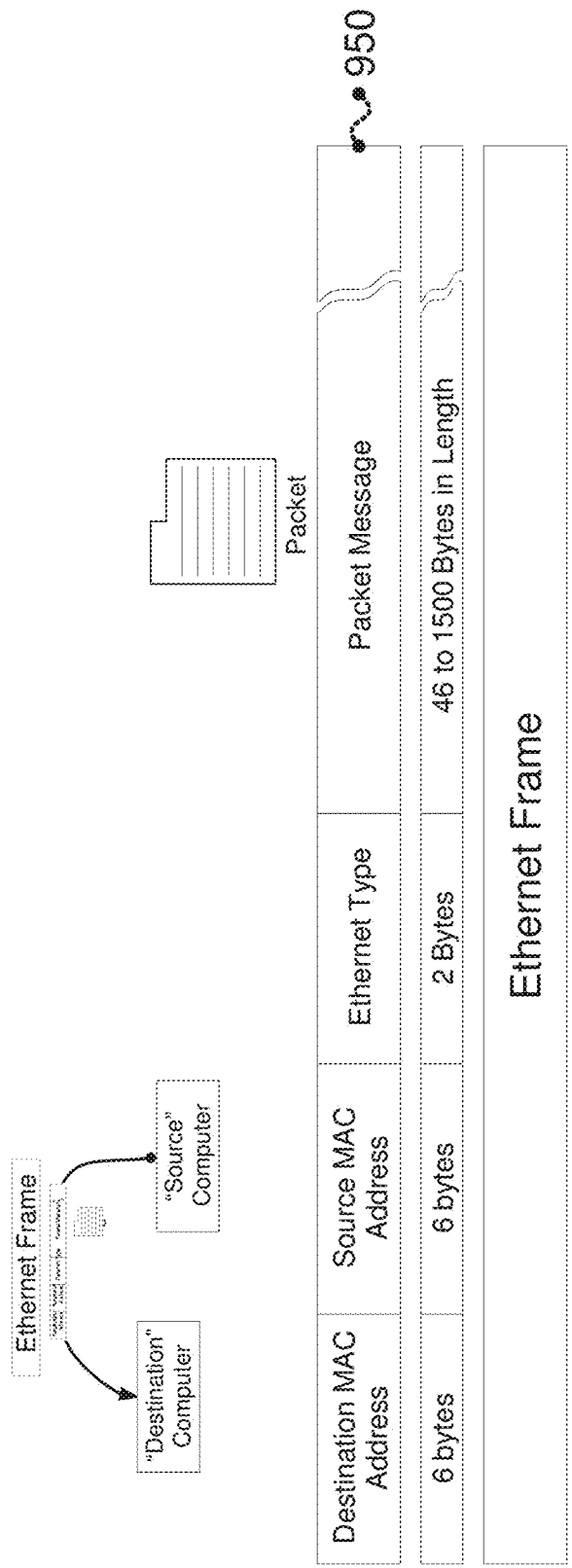
FIG. 12 illustrates a conventional Ethernet frame.

A high level description of a conventional Ethernet frame is found in FIG. 12. The Ethernet frame has a maximum length of about 1514 bytes. One Ethernet frame 950 would fit in an OSFA 2 kbyte cache bank.

Figure 13:
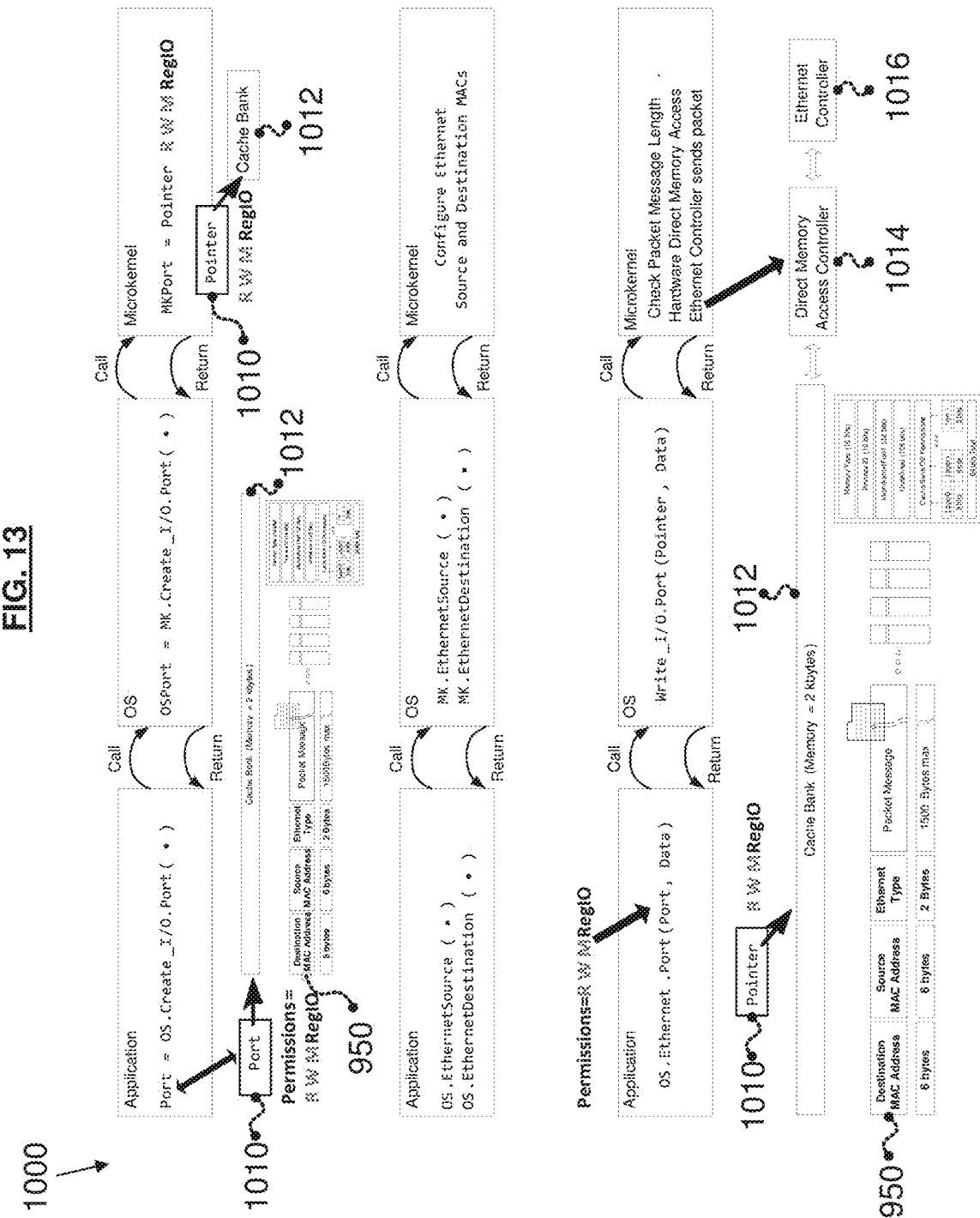
FIG. 13 illustrates an Ethernet I/O example according to an embodiment herein.

FIG. 13 illustrates an example cache bank and Ethernet frame 1000. The example illustrates using an OSFA cache bank to send an Ethernet packet 950. The application software calls the thick OS which calls the microkernel to create a pointer 1010 to cache bank 1012 for the Ethernet packet 950. The application then calls thick OS and the microkernel configures the cache bank memory type as Ethernet. The application calls to set the source and destination MAC addresses in 1012; the microkernel then checks to see if the MAC addresses are valid. The source and destination MAC addresses are stored in the cache bank as R W M (not allowed by the application and thick OS). The source and destination addresses are trusted because the permission bits block access to the application and thick OS. The microkernel checks the packet length and then configures the DMA controller 1014 to transfer the packet to the Ethernet controller 1016. The cache bank architecture and permission bits provide a general interface for all I/O operations for the OSFA. Any attempt to bypass the hardware sandbox enforced by the permission bits results in a hardware level exception as illustrated in FIG. 10.

Figure 14:
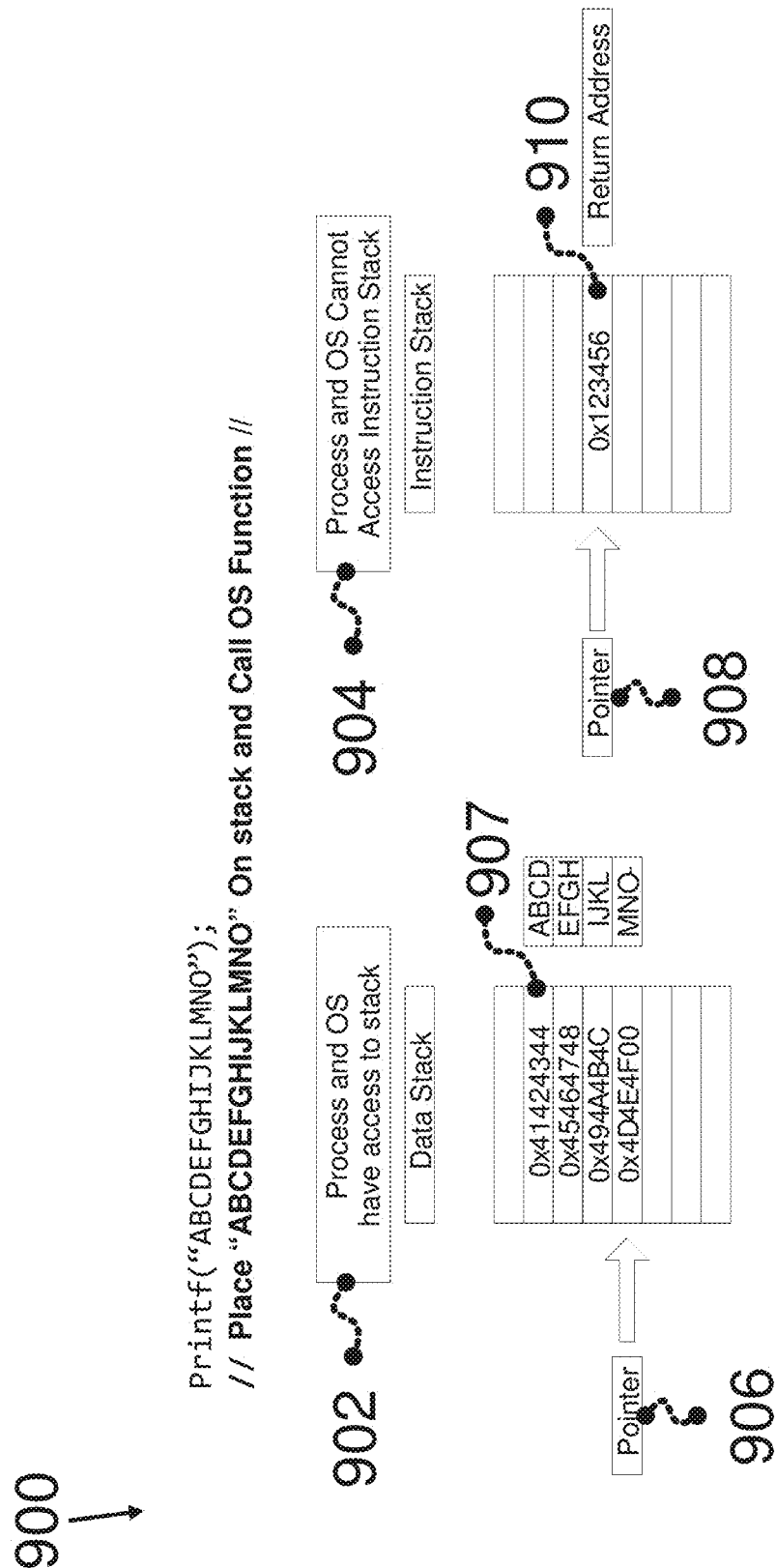
FIG. 14 illustrates an example process stack according to an embodiment herein.

A running process executes the machine code equivalent 900 of printf("ABCDEFGHIJKLMNO"); in FIG. 14. The string is place on the stack 902 and the thick OS function printf( ) is called. The return address is placed on an instruction stack 904. The executing process can only place data on the "data stack" 902. The process does not have any access to the instruction stack 904. The return address is not contained on the "data stack" 902. Overwriting data stack array cannot modify the return pointer 908 with memory contents 910 (stack value). The OS library call will need to check the length of the string. If the stack was overwritten, the printf( ) call would continue printing characters until a null string character was found or memory access violation occurs. The printf( ) would need to check string length, or a maximum length would need to be defined (for example, 1024 characters). The application process does not have access to the return address and cannot maliciously modify the return address. Any attempt to bypass the hardware sandbox enforced by the permission bits results in a hardware level exception as illustrated in FIG. 10.

Figure 15:
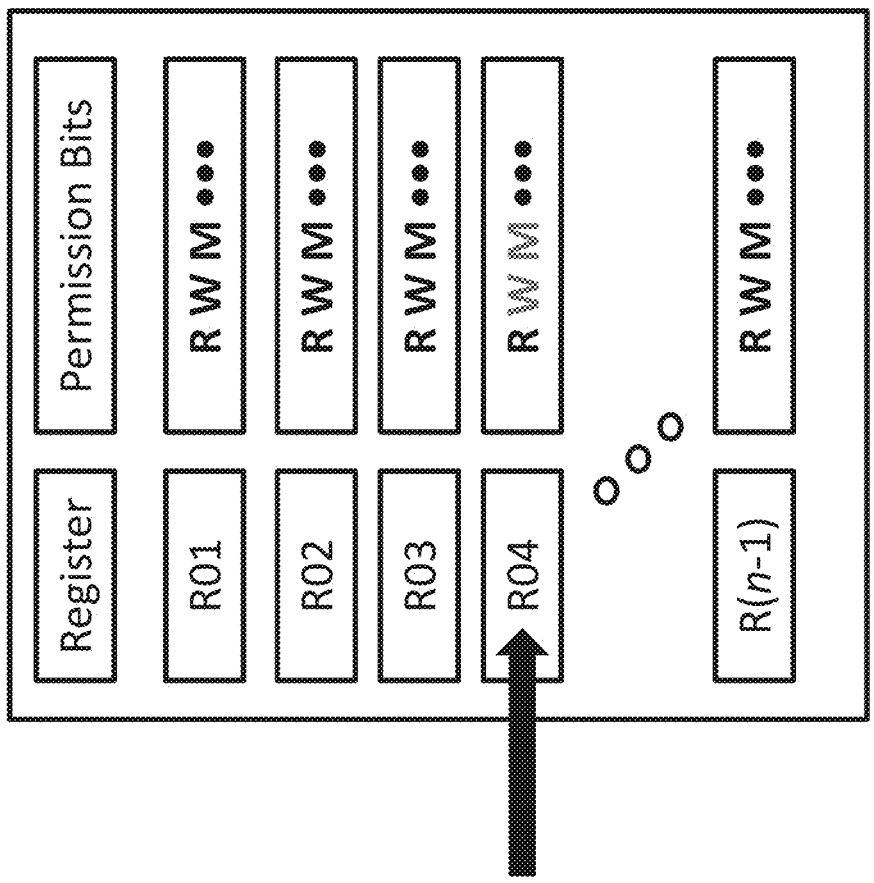
FIG. 15 illustrates real-time debugging according to an embodiment herein.

A real-time debugging example is illustrated in FIG. 15. The embodiments herein provide program debugging at the register level, memory address, and/or cache bank by setting permission bits to R W M (Read=allowed, Write=not allowed, and Modify=not allowed) to trap all writes made to a register, memory address, and/or cache bank. The settings R W M would trap all accesses. This allows for hardware level debugging with no performance overhead at the hardware and software levels until a blocked operation occurs (for R W M blocked operation is write).

Figure 16:
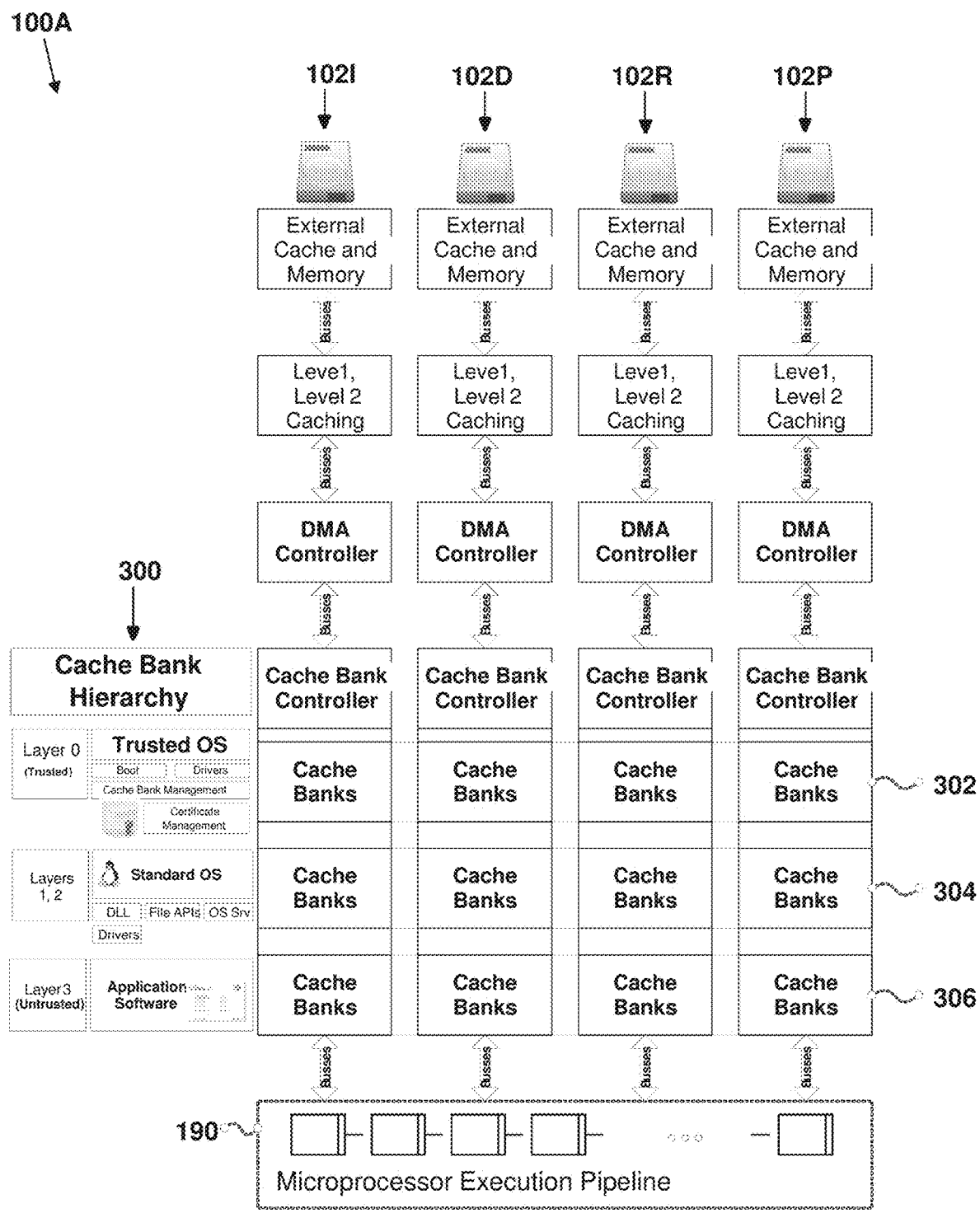
FIG. 16 illustrates an example OSFA software and hardware hierarchy according to an embodiment herein.

FIG. 16 illustrates a diagram of a possible OSFA implementation 100A. A modified extended Harvard architecture could be used to combine memory pipelines 102I, 102D, 102R, and 102P. FIGS. 1, 5, 6, 7, and 8 illustrate the OSFA for the 4-layer architecture 300 described above. The trusted OS, microkernel, (layer 0) 302, standard (thick) OS (layers 1 and 2) 304, and applications software (layer 3) 306 cache banks are also shown. The OSFA provides a hardware and software framework for a more secure computer system. Any attempt to bypass the hardware sandbox enforced by the permission bits results in a hardware level exception as illustrated in FIG. 10.

The embodiments herein provide a cache bank pipeline architecture and cache bank permission bits to provide a more secure computer architecture without a performance penalty. The cache bank pipeline architecture uses less power than a conventional architecture. The DMA controllers allow for lower speed I/O to main memory; thereby reducing power.

The access layers and permission bit examples describe how control information is isolated from thick OS and application software access levels. The trusted OS (microkernel) can give the thick OS access to system resources like memory; however, the thick OS is limited to only the resources isolated from the microkernel. The thick OS and application do not have access to any trusted OS (microkernel) resources. If an application is trusted more than the thick OS, the trusted OS (microkernel) could configure the permission bits to isolate an untrusted OS from the more trusted application.

The OSFA offers features that would help develop a future level 0 hypervisor. The cache bank and permission bit hierarchy offers hardware level features to create a sub level 1 hypervisor. For interrupt driven threads, zero overhead context switching is possible with a more advanced OSFA architecture using a simple round-robin scheduling algorithm.

The embodiments herein may be used for any application requiring computer security, information assurance, and/or safety critical computing. The architecture provided by the embodiments herein also offers reduced power consumption compared to a conventional architecture.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A microprocessor computer system for secure/high assurance/safety critical computing, said microprocessor computer system comprising:
    a hardware subsystem comprising a plurality of cache controller and cache bank modules, wherein the modules comprise cache bank hardware permission bits and memory cell hardware permission bits for managing and controlling access to system resources; and
    a computer security framework subsystem comprising a hierarchy of access layers comprising top layers and lower layers,
    wherein said cache bank hardware permission bits and said memory cell hardware permission bits provide hardware level computer security primitives for a computer operating system,
    wherein said top layers are completely trusted and said lower layers are moderately trusted to completely untrusted,
    wherein said top layers comprise a trusted operating system layer that executes management and control of said system resources, said cache bank hardware permission bits, and said memory cell hardware permission bits,
    wherein said cache bank hardware permission bits and said memory cell hardware permission bits define limits for a hardware execution security mechanism for less trusted to completely untrusted software, and
    wherein exceeding bounds of the security mechanism results in a hardware exception thereby blocking all attempts to access or modify resources outside said security mechanism
    and further wherein said modules comprise:
        a program instruction memory module comprising a first internal cache, a first external cache and memory module, a first direct memory access (DMA) controller, and a first cache controller and cache bank module;
        a data memory module comprising a second internal cache, a second external cache and memory module, a second DMA controller, and a second cache controller and cache bank module;
        a register memory module comprising a third internal cache, a third external cache and memory module, a third DMA controller, and a third cache controller and cache bank module; and
        a pipeline state memory module comprising a fourth internal cache, a fourth external cache and memory module, a fourth DMA controller, and a fourth cache controller and cache bank module,
    wherein said hardware subsystem further comprises a microprocessor execution pipeline connected to the first, second, third, and fourth cache controller and cache bank modules and communicating with the first, second, third, and fourth DMA controller wherein only instructions from said program instruction memory module are executed by said microprocessor execution pipeline.

2. The microprocessor computer system of claim 1, wherein said trusted operating system layer manages and controls the cache bank and memory cell hardware permission bits to enforce said limits of said security mechanism for execution of said less trusted to completely untrusted software.

3. The microprocessor computer system of claim 1, wherein said exceeding bounds of said security mechanism raises a hardware level exception managed by said trusted operating system layer.

4. The microprocessor computer system of claim 1, wherein said trusted operating system layer has full access to all said hardware permission bits and is completely trusted.

5. The microprocessor computer system of claim 1, wherein said modules communicate with said trusted operating system layer.

6. The microprocessor computer system of claim 1, wherein said trusted operating system layer manages and controls said hardware level computer security primitives for said modules; said cache bank hardware permission bits, and said memory cell hardware permission bits.

7. The microprocessor computer system of claim 1, wherein said trusted operating system layer manages said hardware exception resulting from exceeding said bounds of said hardware execution security mechanism.

8. The microprocessor computer system of claim 1, wherein said program instruction memory module, said data memory module, said register memory module, and said pipeline state memory module are isolated from one another and perform memory read/write functions independently of one another.

9. The microprocessor computer system of claim 1, further comprising a cache bank lookup table that reduces the number of memory bits required to hold said memory cell hardware permission bits.

10. The microprocessor computer system of claim 1, wherein each of the first, second, third, and fourth cache controller and cache bank modules comprise an interface layer in communication with said trusted operating system layer.

11. The microprocessor computer system of claim 1, wherein said cache bank hardware permission bits and said memory cell hardware permission bits provide instruction, data, register, cache bank and memory cell level trapping to debug software in real-time.

12. The microprocessor computer system of claim 1, wherein each of the first, second, third, and fourth cache controller and cache bank modules, and each of the first, second, third, and fourth DMA controllers manage overhead of a context switch for said computer operating system.

13. The microprocessor computer system of claim 1, wherein said trusted operating system layer permits said computer operating system to have access to computer system resources that are isolated from said trusted operating system layer.

14. The microprocessor computer system of claim 1, wherein said hardware subsystem and said computer security framework subsystem comprise an operating system friendly microprocessor computer architecture system.

15. The microprocessor computer system of claim 14, wherein said trusted operating system layer manages all permission bit settings, hardware exceptions, input/output, memory management, and DMA settings for said computer architecture.

16. The microprocessor computer system of claim 1, wherein the first, second, third, and fourth cache controller and cache bank modules, and the first, second, third, and fourth DMA controllers, respectively, are separated from one another.

17. The microprocessor computer system of claim 1, wherein said pipeline state memory module is configured into latches of said microprocessor execution pipeline.

18. A microprocessor computer system for secure/high assurance/safety critical computing, said microprocessor computer system comprising:
    a hardware subsystem comprising a plurality of cache controller and cache bank modules, wherein the modules comprise cache bank hardware permission bits and memory cell hardware permission bits for managing and controlling access to system resources; and
    a computer security framework subsystem comprising a hierarchy of access layers comprising top layers and lower layers,
    wherein said cache bank hardware permission bits and said memory cell hardware permission bits provide hardware level computer security primitives for a computer operating system,
    wherein said top layers are completely trusted and said lower layers are moderately trusted to completely untrusted,
    wherein said top layers comprise a trusted operating system layer that executes management and control of said system resources, said cache bank hardware permission bits, and said memory cell hardware permission bits,
    wherein said cache bank hardware permission bits and said memory cell hardware permission bits define limits for a hardware execution security mechanism for less trusted to completely untrusted software, and
    wherein exceeding bounds of the security mechanism results in a hardware exception thereby blocking all attempts to access or modify resources outside said security mechanism
    further wherein said cache bank hardware permission bits and said memory cell hardware permission bits provide instruction, data, register, cache bank and memory cell level trapping to debug software in real-time
    and further wherein software program debugging occurs at any of a register level, a memory address level, and a cache bank level by selectively setting said cache bank hardware permission bits and said memory cell hardware permission bits to a predetermined configuration.

* * * * *